Dec. 23, 1952 A. E. BENEDICT 2,622,445
MOTION CONVERTING APPARATUS
Filed Nov. 30, 1949 3 Sheets-Sheet 3
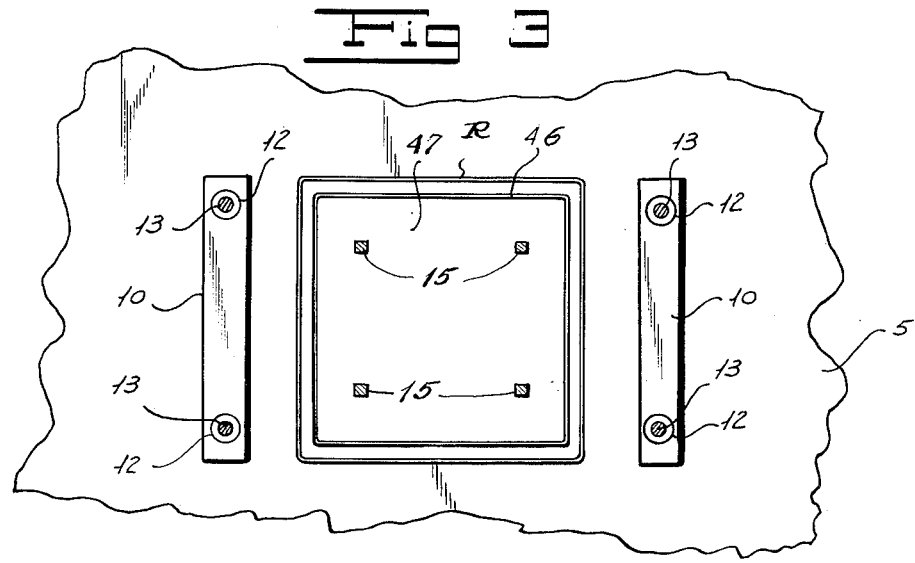
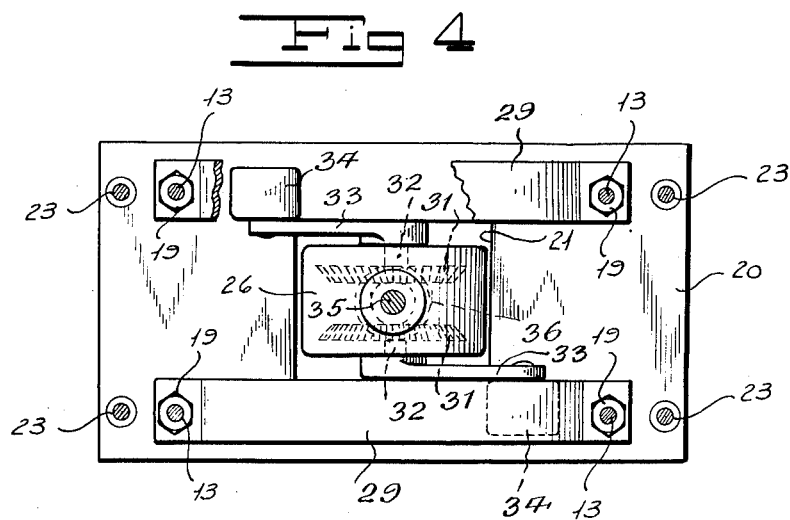
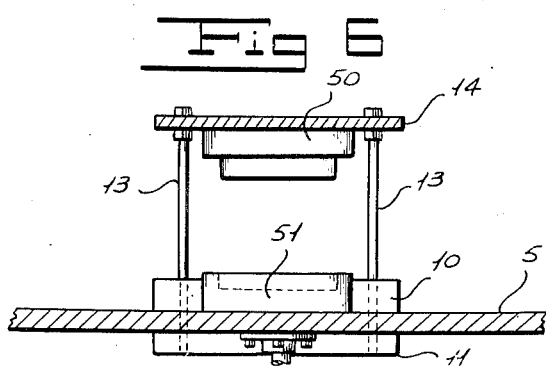
INVENTOR
ALTON E. BENEDICT
BY
Robert F. Beck
ATTORNEY Patented Dec. 23, 1952

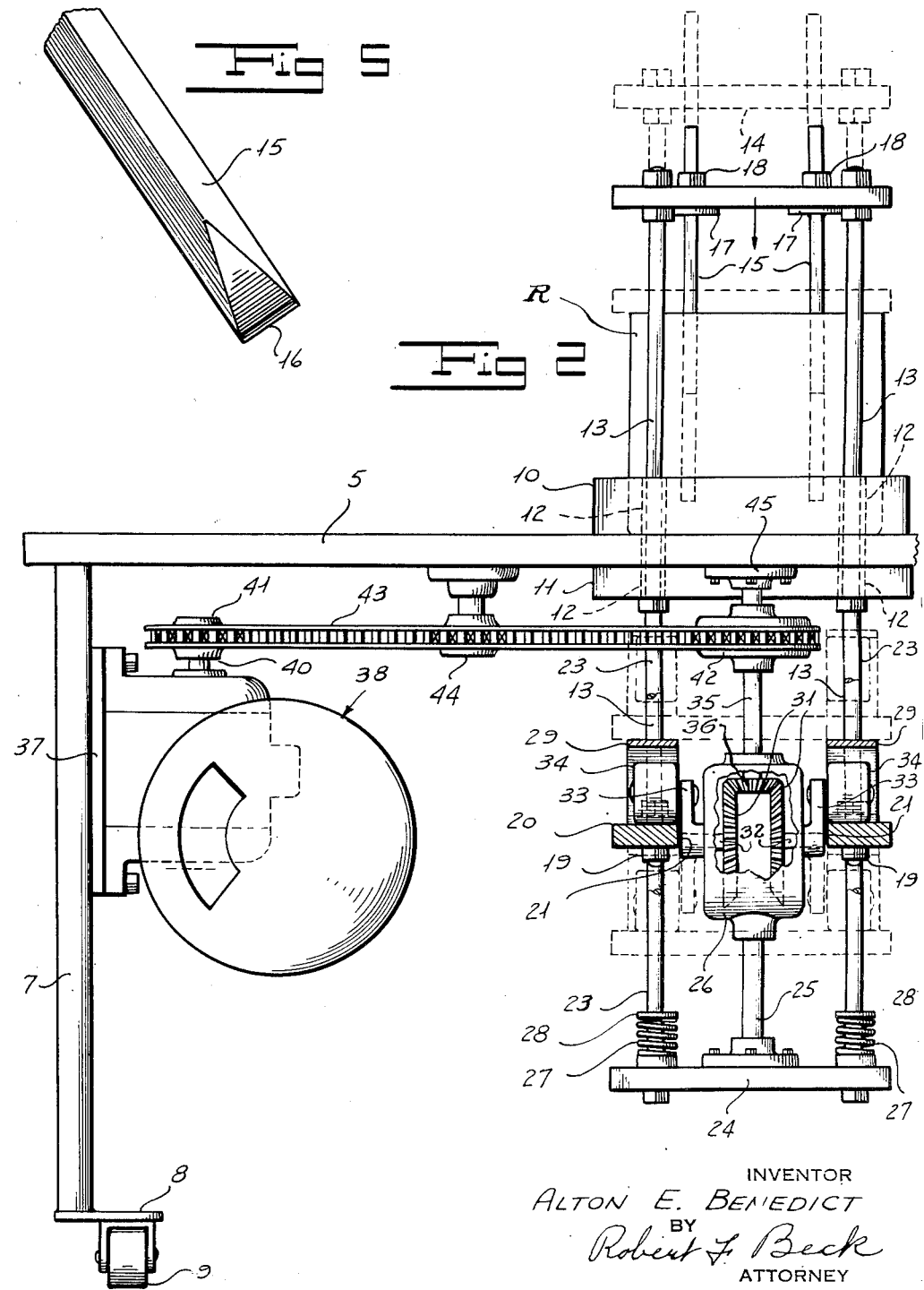

2,622,445

UNITED STATES PATENT OFFICE 2,622,445

MOTION CONVERTING APPARATUS

Alton E. Benedict, Fair Lawn, N. J.

Application November 30, 1949, Serial No. 130,279

1 Claim. (Cl. 74—50)

My invention relates to motion converting apparatus adaptable for use in conjunction with means for splitting butter or other similar products or materials.

Under present day practices, butter in relatively large quantities is packaged in cartons, frozen therein and then shipped to consumers or processors for use in the manufacture of food products or the like. In order to remove the frozen butter from the cartons and facilitate its use in processing, manually wielded axes or similar tools are employed to split the butter into segments or chunks. Inasmuch as the butter contained in the cartons is in the form of relatively large and frozen cakes, weighing, in many instances, fifty pounds or more, the manual splitting of these cakes is highly unsatisfactory for many reasons, for instance, the great disparity in chunk sizes obtained and the amount of labor and time required.

My invention serves to eliminate the foregoing described unsatisfactory and undesirable manner of treating the butter, it being one of the objects of my invention to provide apparatus for operating means to reduce the relatively large and frozen cakes of butter into segments or chunks of a suitable size to permit ready removal from the carton and use for processing.

Another object of my invention is to provide apparatus of the foregoing described character which is so constructed and arranged as to quickly effect the reduction of the butter into segments or chunks and with a minimum of effort on the part of the operator.

A still further object of my invention is to provide apparatus of the foregoing described character which is simple in construction, durable in use, efficient in operation, economical in manufacture, and capable of being operated by other than skilled labor.

An important object of my invention is to provide an apparatus of the foregoing described character which lends itself to uses other than in conjunction with the splitting of butter and without extensive modification.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 2 is a sectional view taken on the line 2—2 of Figure 1.

Figure 3 is a detail transverse sectional view taken on the line 3—3 of Figure 1.

Figure 4 is a detail sectional view taken on the line 4—4 of Figure 1.

Figure 5 is a fragmentary perspective view illustrating the lower or penetrating end of one of the splitting elements.

Figure 6 is a detail sectional view of the upper portion of a modification.

Figure 1:
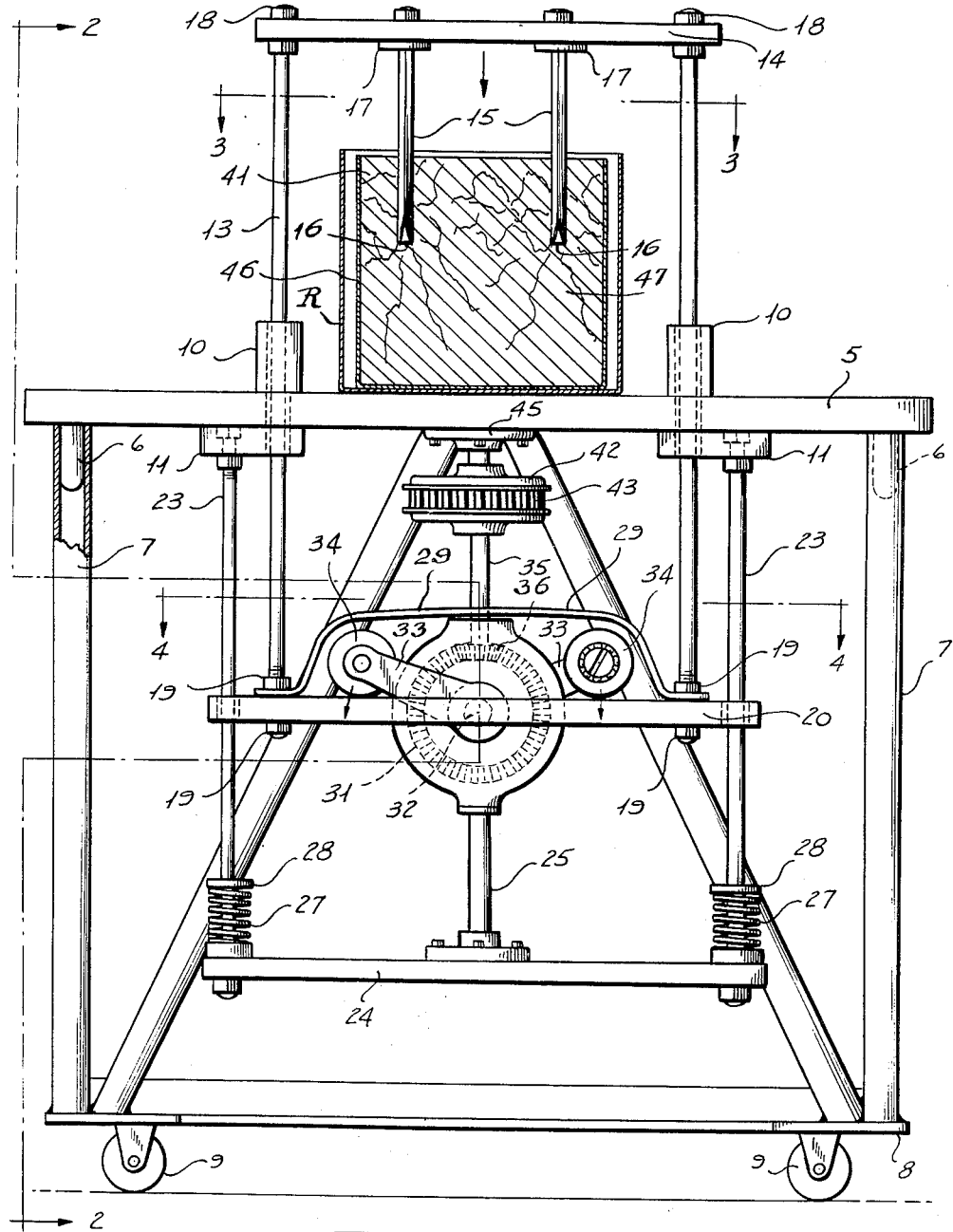
Figure 1 is an elevation of an apparatus constructed in accordance with my invention.

In practicing my invention, as illustrated in Figures 1 to 5 inclusive of the drawings, I provide a table having a top 5 provided on its under face and at the corners thereof, with depending dowels 6 or the like detachably seated within the upper ends of tubular standards 7 on which the stop 5 is supported whereby the top may be readily removed or replaced. The lower ends of the standards 7 are connected together by a frame 8 to which is secured rollers or casters 9 to facilitate movement of the table from one plate to another.

Pairs of elongated spaced bearing blocks 11 are secured to the upper and lower faces, respectively, of the top 5 and have their end sections provided with bushings 12 in which are slidably mounted a quaternary of rods or members 13. The upper ends of the rods 13 extend through the corner sections of a plate-like tool-holder 14 and are secured in fixed relation therewith by nuts threaded on their upper ends against the upper and lower faces of the holder. The toolholder has detachably secured thereto a plurality of tools or splitting elements 15, the body of each element or tool, between its upper and lower end sections, being substantially square in cross section to provide the body with a quaternary of side faces, while its lower end section is formed with a pair of oppositely disposed triangular shaped tapered faces terminating at their lower margins in a cutting edge 16 extending transversely of the body. The upper ends of the tapered faces terminate in points intermediate pairs of the side faces of the body as illustrated in Figure 5. The upper end section of each tool is provided with a collar 17 for engaging the lower face of the holder 14 and is formed above the collar with a threaded portion on which is provided a nut 18 engaging the upper face of the holder 14 and coacting with the collar to secure the element or tool 15 in fixed relation with the holder.

The lower ends of the rods 13 are threaded and extend through and are connected, by means of nuts 19, to a motion transmitting plate 20 formed with a central opening 21. Secured to and extending from the blocks 11 carried by the top 5, are a quaternary of rods 23 having their lower ends fixed to and supporting a bed 24 on which is mounted the lower end of a support 25 having its upper end supporting and fixed to the underface of a gear housing 26. The lower end sections of the rods 23 have sleeved thereon cushioning springs 27 supporting, on their upper ends, bumper washers or the like 28, for engaging and cushioning the plate 20 as will hereinafter be made apparent.

The corners of the plate 20 have extending therethrough bushings which slidably receive the rods 23, thus slidably mounting the plate 20 for reciprocation on the rods 23.

A pair of spaced inverted substantially U-shaped bands 29 each have their ends attached to the lower end sections of a pair of rods 13 by the nuts 19 as illustrated in Figure 1 and which bands 29 are disposed laterally of the slot 21, the inner faces of the bands and the confronting face portions of the plate 20 thereunder constituting a pair of roller paths. The gear housing 26 has mounted therein a pair of spaced confronting beveled gears 31 each fixed to a shaft 32 extending through an adjacent side of the housing and having fixed to its outer end, the inner end of an arm 33, the outer end of the arm having pivoted thereon a ball bearing mounted roller 34. The upper end of the housing 26 has rotatably mounted therein the lower end of a driven shaft 35 to which is fixed a pinion 36 disposed between the gears 31 and meshing therewith, whereby, upon rotation of the pinion 36, the gears 31 rotate in opposite directions relative to each other and cause similar rotation of the arms 33.

Secured to and between a pair of the standards 7, there is provided a plate or panel 37 on which is mounted a power unit 38 comprising an electric motor connected to a speed reducer having a power output shaft 40 provided with a sprocket 41 connected to a similar sprocket 42 mounted on the shaft 35 by means of a chain 43, a guide sprocket 44 being rotatably mounted on the underface of the top 5 and engaging the chain for guiding the latter during travel about the sprockets 41 and 42. The upper end of the shaft 35 is mounted in a bearing 45 secured to the underface of the top 5 as clearly illustrated in the drawings. The motor of the power unit 38 is connected by a wiring circuit to a suitable source of electrical energy and is energized by closing a switch in the circuit.

In use, a carton 46, containing butter 47 or the like in frozen cake form is disposed on the top 5 between the blocks 10 and beneath the tools 15, the toolholder 14 being in its uppermost position, as illustrated in dotted lines in Figure 2. When the carton is thus positioned, the motor is energized whereupon the shaft 35 is operated and the arms 33 are rotated about their axes in opposite directions.

Inasmuch as the arms are in their uppermost position at the start of the operation, they rotate downwardly towards the plate 20 with the rollers engaging the bands 29 and thus supporting the plate 20. As the arms rotate downwardly, the rollers engage the plate 20 and effect lowering thereof, and resultant engagement of the tools with the butter, it being understood that the resistance offered by the butter to the tools 15 serves to maintain the plate in contact with the rollers 34 during continued downward movement of the plate. As the plate approaches its lowermost position, it is engaged by the bumper washers 28 which also function to maintain the plate in engagement with the rollers 33, until the latter, during upward movement of the arms, again engage the bands 29 whereupon the rollers track the bands and effect raising of the plate 20. From the foregoing, it will be apparent that the plate 20, bands 29 and rollers 34 coact to effect reciprocation of the rods 13 and as a consequence, the tools 15 are forced downwardly into the cake of butter to effect splitting of the same and upwardly therefrom to permit removal of the carton, the motor being deenergized when the tools return to their uppermost positions. Inasmuch as the carton is often ruptured during the splitting operation, the carton may be contained in a suitable receptacle R or the like.

In the modified form illustrated in Figure 6, the tools 15 are replaced by a die assembly comprising male and female members 50 and 51 secured to the toolholder 14 and top 5, respectively, whereby upon reciprocation of the toolholder, material interposed between the die members will be die cut or otherwise treated in accordance with the function of the die members.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefore as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claim.

What I claim is:

In an apparatus of the class described; a reciprocally operated plate for imparting reciprocating motion to work performing mechanism and with said plate being formed with a centrally disposed opening; plate actuating means disposed through said opening and equipped with a pair of axially aligned oppositely rotated power output shafts having a common axis; a pair of arms fixed to said shafts for rotation about the latter and provided with rollers; a pair of inverted substantially U-shaped bands having end sections secured to said plate adjacent said opening and coacting with the latter to define a straight roller path adjacent the sides of said opening, respectively; said rollers being disposed between said bands and said plate, respectively, for tracking engagement over said path and about said axis whereby to effect reciprocation of said plate relative to said actuating means; and power means connected to said shafts for rendering the latter effective.

ALTON E. BENEDICT.

REFERENCES CITED

The following references are of record in the file of this patent:

UNITED STATES PATENTS

| Number | Name | Date |
|---|---|---|
| 1,205,895 | Hoyt | Nov. 25, 1916 |
| 1,432,041 | Scott | Oct. 17, 1922 |
| 1,494,547 | Hubbard | May 20, 1924 |
| 1,782,305 | Kay | Nov. 18, 1930 |
| 2,096,641 | Lantz | Oct. 19, 1937 |
| 2,171,946 | Palmros | Sept. 5, 1939 |
| 2,439,840 | Buroff | Apr. 20, 1948 |
| 2,455,579 | Hensel | Dec. 7, 1948 |
| 2,505,601 | Bender et al. | Apr. 25, 1950 |